US009927269B2

(12) United States Patent
Imai et al.

(10) Patent No.: US 9,927,269 B2
(45) Date of Patent: Mar. 27, 2018

(54) PRESSURE DETECTION DEVICE

(71) Applicant: Surpass Industry Co., Ltd., Gyoda-shi, Saitama (JP)

(72) Inventors: Hiroshi Imai, Saitama (JP); Takashi Imai, Saitama (JP)

(73) Assignee: Surpass Industry Co., Ltd., Gyoda-shi, Saitama (JP)

( * ) Notice: Subject to any disclaimer, the term of this patent is extended or adjusted under 35 U.S.C. 154(b) by 0 days.

(21) Appl. No.: 15/420,534

(22) Filed: Jan. 31, 2017

(65) Prior Publication Data

US 2017/0219396 A1  Aug. 3, 2017

(30) Foreign Application Priority Data

Feb. 3, 2016 (JP) .................................. 2016-019244

(51) Int. Cl.
*G01L 7/08* (2006.01)
*G01F 1/38* (2006.01)
*G01L 19/00* (2006.01)

(52) U.S. Cl.
CPC .......... *G01F 1/383* (2013.01); *G01L 19/0023* (2013.01); *G01L 19/0046* (2013.01)

(58) Field of Classification Search
CPC .......... G01L 7/08; G01F 1/383; A61M 1/3639
See application file for complete search history.

(56) References Cited

U.S. PATENT DOCUMENTS

| 8,079,252 B2 * | 12/2011 | Weber .................... G01L 23/24 |
| | | 73/114.18 |
| 8,857,277 B2 * | 10/2014 | Huang .................... G01L 9/007 |
| | | 73/728 |
| 2002/0194924 A1 | 12/2002 | Ozawa |
| 2005/0160828 A1 | 7/2005 | Hasunuma |

(Continued)

FOREIGN PATENT DOCUMENTS

| DE | 2419187 A1 | 11/1975 |
| DE | 203 21 557 U1 | 1/2008 |

(Continued)

OTHER PUBLICATIONS

Extended European Search Report dated Jun. 20, 2017 (English Translation).

(Continued)

*Primary Examiner* — Jewel V Dowtin
(74) *Attorney, Agent, or Firm* — Muncy, Geissler, Olds & Lowe, P.C.

(57) ABSTRACT

Provided is a pressure detection device including: a pressure detection unit; and a flow channel unit provided with a flow channel and a pressure receiving portion. The pressure detection unit includes a pressure sensor including a diaphragm, and a pressure transmission portion which is disposed in a state where one end of the pressure transmission portion is in contact with the diaphragm and the other end thereof is in contact with the diaphragm, and transmits a pressure of a fluid received by the diaphragm to the diaphragm. The pressure transmission portion is disposed in a (Continued)

state where the diaphragm is displaced toward the flow channel and an urging force directed from the diaphragm to the diaphragm is received.

9 Claims, 4 Drawing Sheets

(56) References Cited

U.S. PATENT DOCUMENTS

| | | |
|---|---|---|
| 2008/0110267 A1* | 5/2008 | Sheikh-Bahaie ... B60C 23/0408 73/700 |
| 2008/0229838 A1 | 9/2008 | Kleven et al. |
| 2013/0073225 A1* | 3/2013 | Huang ..................... G01L 9/14 702/50 |
| 2014/0076058 A1 | 3/2014 | Brugger et al. |
| 2017/0028119 A1 | 2/2017 | Brugger et al. |

FOREIGN PATENT DOCUMENTS

| | | |
|---|---|---|
| JP | 2005-207946 A | 8/2005 |
| WO | WO 2008/115346 A2 | 9/2008 |

OTHER PUBLICATIONS

Partial European Search Report dated Jun. 23, 2017 (English Translation).

* cited by examiner

PRESSURE DETECTION DEVICE

CROSS-REFERENCE TO RELATED APPLICATIONS

This application is based on Japanese Patent Application No. 2016-019244, the contents of which are incorporated herein by reference in its entirety.

TECHNICAL FIELD

The present disclosure relates to a pressure detection device that detects a pressure of a fluid circulated through a flow channel.

BACKGROUND ART

An in-line type pressure sensor having a structure in which a body provided with a flow channel for circulating a liquid, such as a drug solution, and a sensor body for detecting a pressure of the liquid transmitted to a pressure receiving surface through a protective sheet are integrally formed has been conventionally known (for example, see Japanese Unexamined Patent Application, Publication No. 2005-207946 (hereinafter referred to as "JP 2005-207946")).

The pressure sensor disclosed in JP 2005-207946 detects the pressure of the fluid transmitted to the sensor body through the protective sheet mounted to a lower surface of the sensor body.

SUMMARY

Technical Problem

The pressure sensor disclosed in JP 2005-207946 can obtain a detected value corresponding to a pressure at which the fluid presses the protective sheet when the protective sheet is pressed against the lower surface of the sensor body by the pressure of the fluid.

However, the pressure sensor disclosed in JP 2005-207946 cannot obtain the detected value corresponding to the pressure (negative pressure) of the fluid, when the pressure sensor receives a force generated when the pressure of the fluid is reduced and the protective sheet is separated from the lower surface of the sensor body. This is because the pressure sensor disclosed in JP 2005-207946 is a capacitance type or piezoelectric type pressure sensor which obtains, as a detected value, a force generated when the lower surface of the sensor body is pressed.

Accordingly, the pressure sensor disclosed in JP 2005-207946 cannot accurately detect the pressure of the fluid when the pressure of the fluid is temporarily reduced and becomes a negative pressure. In a measurement using an adhesive or the like, the adhesive serves as a buffering agent; air bubbles are formed in the adhesive; or films have wrinkles, which makes it difficult to accurately measure the negative pressure.

The present disclosure has been made in view of the above-mentioned circumstances, and an object of the present disclosure is to provide a pressure detection device capable of accurately detecting a pressure of a fluid even when the pressure of the fluid is temporarily reduced and becomes a negative pressure.

Solution to Problem

In order to solve the above-mentioned problem, the present disclosure employs the following solutions.

A pressure detection device according to one aspect of the present disclosure includes: a pressure detection unit configured to detect a pressure to be transmitted to a pressure detection portion; and a flow channel unit provided with a flow channel through which a fluid is circulated in a circulation direction from an inflow port to an outflow port, and a pressure receiving portion configured to be displaced by receiving a pressure of the fluid circulated through the flow channel. The pressure detection unit includes: a pressure sensor including the pressure detection portion; and a pressure transmission portion disposed in a state where one end of the pressure transmission portion is in contact with the pressure detection portion and the other end of the pressure transmission portion is in contact with the pressure receiving portion, the pressure transmission portion being configured to transmit, to the pressure detection portion, the pressure of the fluid received by the pressure receiving portion. The pressure transmission portion is disposed in a state where the pressure receiving portion is displaced toward the flow channel and an urging force directed from the pressure receiving portion to the pressure detection portion is received.

In the pressure detection device according to one aspect of the present disclosure, the pressure transmission portion which is disposed in the state where one end of the pressure transmission portion is in contact with the pressure detection portion of the pressure sensor and the other end of the pressure transmission portion is in contact with the pressure receiving portion of the flow channel unit is disposed in the state where the urging force directed from the pressure receiving portion to the pressure detection portion is received. Therefore, even when the pressure of the fluid circulated through the flow channel is temporarily reduced and becomes a negative pressure, the pressure detection portion is in a state where the pressure transmission portion receives a pressure having a value obtained by subtracting a pressure value corresponding to a negative pressure from a pressure value equivalent to an urging force received from the pressure receiving portion. Thus, even when the pressure of the fluid is temporarily reduced and becomes a negative pressure, the pressure detection portion can obtain a pressure value obtained by subtracting a decrease in the pressure value corresponding to the negative pressure from the pressure value equivalent to the urging force received from the pressure receiving portion.

Thus, according to the pressure detection device of one aspect of the present disclosure, it is possible to provide a pressure detection device capable of accurately detecting a pressure of a fluid even when the pressure of the fluid is temporarily reduced and becomes a negative pressure.

The pressure detection device according to one aspect of the present disclosure may have a structure in which: the flow channel unit includes a recess in which the pressure receiving portion is disposed; the pressure sensor is disposed in a state where the pressure sensor is in contact with the flow channel unit so as to cover the recess; and the flow channel unit includes a communication flow channel configured to allow an inside space and an outside space to communicate with each other, the inside space and the outside space being partitioned by the recess and the pressure sensor.

With this structure, the inside space partitioned by the pressure sensor and the recess in which the pressure receiving portion of the flow channel unit is disposed communicates with the outside space, and thus it is possible to suppress the occurrence of a malfunction that the volume of the inside space fluctuates according to a displacement of the pressure receiving portion and the pressure of the inside space fluctuates according to the fluctuation of the volume of the inside space.

The pressure detection device according to one aspect of the present disclosure may have a structure in which: the flow channel unit includes: the pressure receiving portion having a circular shape in plan view and formed into a thin film shape; and a flow channel body including a recess with an opening hole opened to the flow channel. The pressure receiving portion is joined to the recess so as to seal the opening hole. The flow channel unit includes an annular holding member disposed in a state where one surface of the holding member is in contact with an outer peripheral portion of the pressure receiving portion and the other surface of the holding member is in contact with the pressure sensor, the holding member being configured to hold the outer peripheral portion of the pressure receiving portion.

In the pressure detection device having the structure as described above, the outer peripheral portion of the pressure receiving portion formed into a thin film shape is joined to the recess, and the annular holding member is disposed in the state where one surface of the holding member is in contact with the outer peripheral portion. The holding member presses the pressure receiving portion against the flow channel as much as possible, while providing the flow channel body with a strength, and further reduces the dead volume of the flow channel. Further, since the holding member is disposed in the state where the other surface of the holding member is in contact with the pressure sensor, the outer peripheral portion of the pressure receiving portion is held by the holding member. Accordingly, even when the inner peripheral portion of the pressure receiving portion that is exposed to the opening hole is repeatedly displaced by the pressure of the fluid, the outer peripheral portion of the pressure receiving portion is held by the holding member, which makes it possible to suppress the occurrence of a malfunction, such as the occurrence of peeling or the like at a joint portion between the recess and the outer peripheral portion of the pressure receiving portion.

The pressure detection device according to one aspect of the present disclosure may have a structure in which: the pressure transmission portion includes: a first pressure transmission member disposed in a state where the first pressure transmission member is in contact with the pressure receiving portion; and a second pressure transmission member disposed in a state where the second pressure transmission member is in contact with the pressure detection portion, and a contact area between the second pressure transmission member and the pressure detection portion is smaller than a contact area between the first pressure transmission member and the pressure receiving portion.

With this structure, the pressure of the fluid received from the pressure receiving portion by the first pressure transmission member can be transmitted while the pressure is locally concentrated on the pressure detection portion through the second pressure transmission member having a small contact area with the opposed member. Therefore, the fluctuation in the pressure locally received by the pressure detection portion with respect to the fluctuation in the pressure of the fluid is increased, thereby making it possible to increase the accuracy of detecting the fluctuation in the fluid pressure.

The pressure detection device having the structure as described above may have a form in which the first pressure transmission member is formed into a spherical shape projecting toward the pressure receiving portion.

With this structure, the contact area where the first transmission member contacts the pressure receiving portion is maintained substantially constant, regardless of the displacement of the pressure receiving portion, and thus the accuracy of transmitting the pressure of the fluid from the pressure receiving portion to the first transmission member can be increased.

In the pressure detection device of the above form, the second pressure transmission member may be a member formed into a spherical shape projecting toward the pressure detection portion.

With this structure, the first pressure transmission member can transmit the fluid pressure received from the pressure receiving portion while locally concentrating the pressure on the pressure detection portion through the second pressure transmission member formed into a spherical shape. Therefore, the fluctuation in the pressure locally received by the pressure detection portion can be increased with respect to the fluctuation in the fluid pressure, and thus the accuracy of detecting the fluctuation in the fluid pressure can be increased.

The pressure detection device according to one aspect of the present disclosure may have a structure in which the pressure transmission portion is disposed in a state where the pressure transmission portion is in contact with the pressure receiving portion and the pressure detection portion, and is formed into a spherical shape.

With this structure, the contact area where the pressure transmission portion contacts the pressure receiving portion is maintained substantially constant, regardless of the displacement of the pressure receiving portion, thereby making it possible to increase the accuracy of transmitting the pressure of the fluid from the pressure receiving portion to the pressure transmission portion.

Further, the pressure transmission portion can transmit the fluid pressure received from the pressure receiving portion while locally concentrating the pressure on the pressure detection portion through the pressure transmission portion formed into a spherical shape. Therefore, the fluctuation in the pressure locally received by the pressure detection portion can be increased with respect to the fluctuation in the fluid pressure, and thus the accuracy of detecting the fluctuation in the fluid pressure can be increased.

Advantageous Effects

According to the present disclosure, it is possible to provide a pressure detection device capable of accurately detecting a pressure of a fluid even when the pressure of the fluid is temporarily reduced and becomes a negative pressure.

DESCRIPTION OF EMBODIMENTS

First Embodiment

A pressure detection device 100 according to a first embodiment of the present disclosure will be described below with reference to the drawings.

Figure 1:
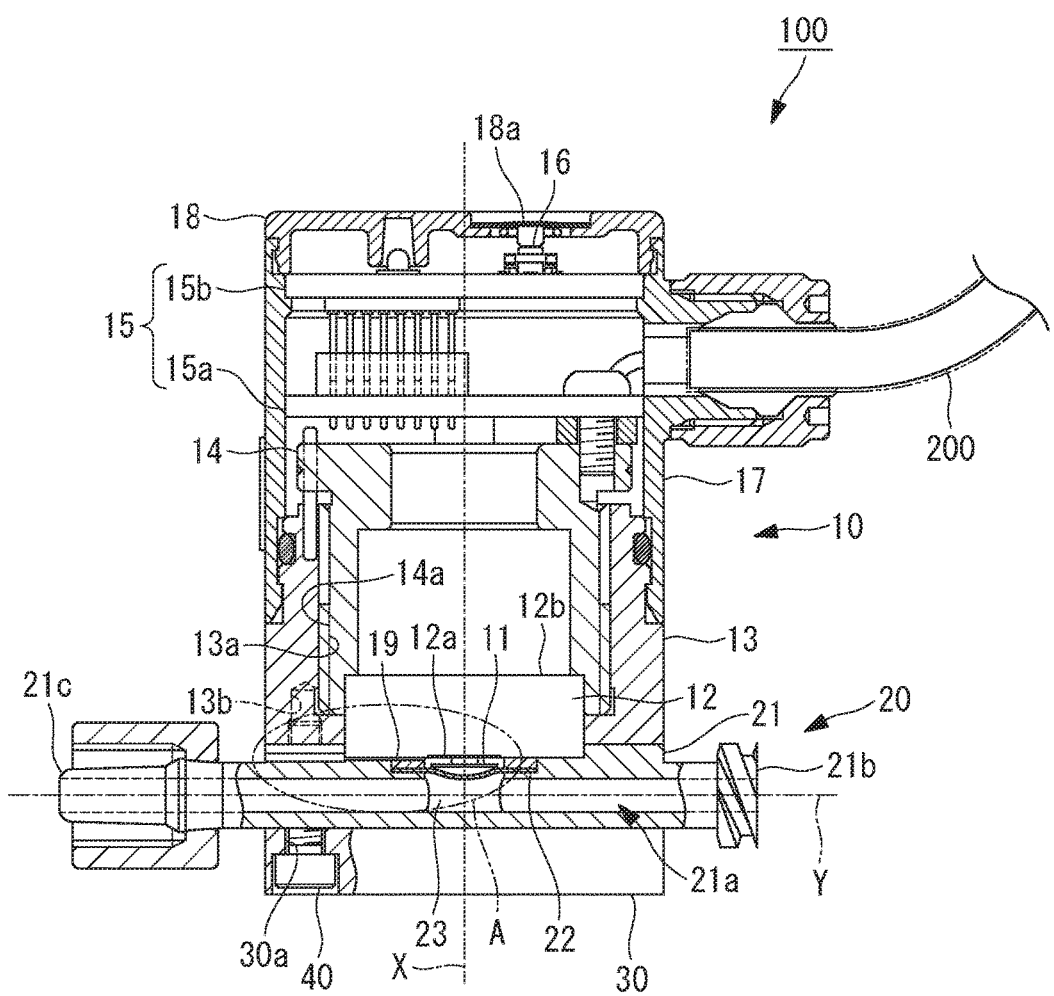
FIG. 1 is a partial longitudinal sectional view showing a pressure detection device according to a first embodiment.

As shown in FIG. 1, the pressure detection device 100 of the first embodiment includes a pressure detection unit 10 for detecting a pressure of a fluid; a flow channel unit 20 including a flow channel body 21 in which a flow channel 21a for circulating the fluid along a linear circulation direction from an inflow port 21b to an outflow port 21c is formed; and a base portion 30 which is mounted in a state where the flow channel unit 20 is sandwiched between the base portion 30 and the pressure detection unit 10. The base portion 30 is coupled to a body portion 13 by fastening a fastening bolt 40, which is inserted from a fastening hole 30a formed in the base portion 30, to a fastening hole 13b which is formed in the body portion 13.

The pressure detection unit 10 shown in FIG. 1 is a device that detects a pressure to be transmitted to a diaphragm 12a (pressure detection portion).

As shown in FIG. 1, the pressure detection unit 10 includes a pressure transmission portion 11 which transmits the pressure of the fluid from a diaphragm 22 (pressure receiving portion); a pressure sensor 12 which detects the pressure of the fluid transmitted from the pressure transmission portion 11; the body portion 13 which accommodates the pressure sensor 12; and a sensor holding portion 14 which holds the pressure sensor 12 in a state where the pressure sensor 12 is disposed on the body portion 13.

The pressure detection unit 10 includes: a sensor substrate 15 which transmits power and an electric signal between the pressure sensor 12 and a cable 200 connected to an external device (not shown); a zero point adjustment switch 16 which performs zero point adjustment of the pressure sensor 12; a housing 17 which accommodates the sensor substrate 15; a cap 18 which is mounted to an upper portion of the housing 17; and a holding member 19 which is disposed between the pressure sensor 12 and the diaphragm 22. The components included in the pressure detection unit 10 will be described below.

The pressure transmission portion 11 is disposed in a state where an upper end (one end) along an axis line X of the pressure transmission portion 11 is in contact with the diaphragm 12a and a lower end (the other end) thereof along the axis line X is in contact with the diaphragm 22 of the flow channel unit 20. The pressure transmission portion 11 transmits the fluid pressure received by the diaphragm 22 to the diaphragm 12a.

Since the pressure transmission portion 11 transmits the fluid pressure to the pressure sensor 12, it is desirable that the pressure transmission portion 11 have a hardness sufficiently higher than that of the diaphragm 22. If the pressure transmission portion has a low hardness, like one used for the diaphragm 22 and the like, the pressure transmission portion serves as a damper that absorbs a pressure, which makes it difficult to measure the pressure accurately.

Figure 2:
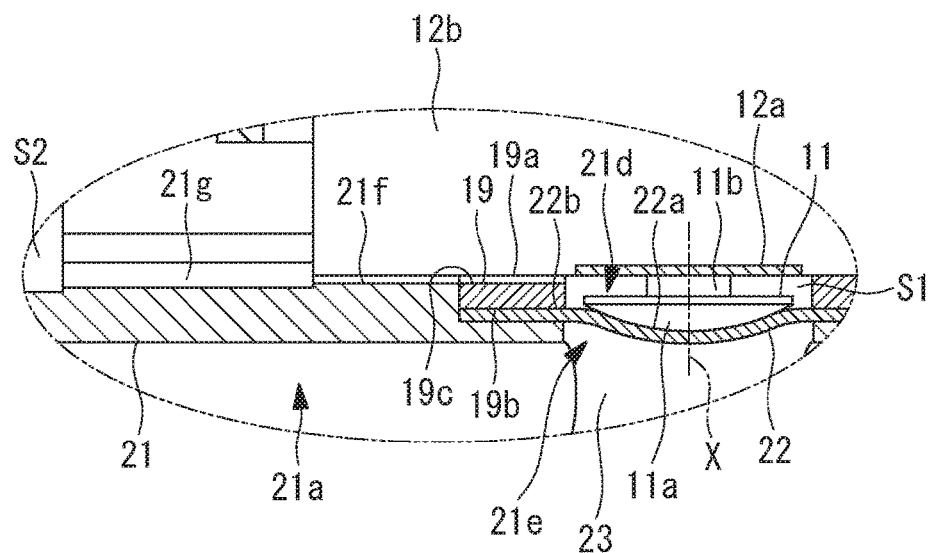
FIG. 2 is a partial enlarged view of a portion "A" shown in FIG. 1.

As shown in FIG. 2 (which is a partial enlarged view of a portion A shown in FIG. 1), the pressure transmission portion 11 includes a spherical member 11a (first pressure transmission member) disposed in contact with the diaphragm 22, and a shaft-like member 11b (second pressure transmission member) disposed in contact with the diaphragm 12a. An upper end face of the shaft-like member 11b is joined to the diaphragm 12a with an adhesive. As the adhesive, a material, such as glass, which is melted by heat, is used. When the adhesive is melted by heat and bonded, the adhesive is cooled and hardened. In this case, the adhesive does not serve as a buffering agent, and thus the pressure can be stably measured. Further, an epoxy resin-based adhesive may be used, although the epoxy resin-based adhesive is inferior to glass with which the pressure can be stably measured and which has a high corrosion resistance.

As shown in FIG. 2, the spherical member 11a is a member formed into a spherical shape projecting toward the diaphragm 22 along the axis line X. The shaft-like member 11b is a member formed into a shaft-like shape extending along the axis line X. The spherical member 11a and the shaft-like member 11b are members integrally formed of, for example, metal such as aluminum, PEEK (polyether ether ketone resin), ceramics, or sapphire.

As shown in FIG. 2, a contact area between the upper end face of the shaft-like member 11b and the diaphragm 12a is smaller than a contact area between the spherical member 11a and the diaphragm 22.

The pressure sensor 12 includes: the diaphragm 12a (pressure detection portion), which is formed into a thin-film shape using a material (for example, sapphire) having a corrosion resistance; a strain resistance (not shown) which is attached to the diaphragm 12a; and a base portion 12b which holds the diaphragm 12a. The pressure sensor 12 is a strain sensor that outputs a pressure signal according to the strain resistance which varies depending on the pressure to be transmitted to the diaphragm 12a.

As described later, an inside space S1 (see FIG. 2) in which the diaphragm 12a is installed is maintained at an atmospheric pressure by a vent groove 21f (communication flow channel) and a vent hole 21g (communication flow channel). Accordingly, the pressure sensor 12 is a sensor that detects a gauge pressure on the basis of the atmospheric pressure.

The body portion 13 is a member that is formed into a cylindrical shape about the axis line X. On the inner peripheral surface of the body portion 13, a female screw 13a for mounting the sensor holding portion 14 to be described later is formed. At a lower end of the body portion 13, fastening holes 13b are formed at a plurality of locations about the axis line X. In a state where the flow channel unit 20 is disposed at a lower end of the body portion 13 and the base portion 30 is disposed at a lower end of the flow channel unit 20, the fastening bolts 40 inserted from the fastening holes 30a of the base portion 30 are fastened to the fastening holes 13b. In a state where the base portion 30 is mounted to the body portion 13, the pressure sensor 12 is inserted into a central portion of the body portion 13 from above along the axis line X.

The sensor holding portion 14 is a member formed into a cylindrical shape about the axis line X, and a male screw 14a is formed in the outer peripheral surface. The sensor holding portion 14 holds the pressure sensor 12 at a predetermined location with respect to the body portion 13 in such a manner that the pressure sensor 12 is disposed on the inner peripheral side of the lower end of the body portion 13 and the male screw 14a formed on the outer peripheral surface is fastened to the female screw 13a formed in the inner peripheral surface of the body portion 13.

The sensor substrate 15 includes a first substrate 15a and a second substrate 15b. The sensor substrate 15 includes, for example, an amplifier circuit (not shown) which amplifies a pressure signal output from the pressure sensor 12; an interface circuit which transmits the pressure signal amplified by the amplifier circuit to a pressure signal line (not shown) of the cable 200; a power supply circuit (not shown) which transmits a power supply voltage supplied from the outside via the cable 200 to the pressure sensor 12; and a zero point adjustment circuit (not shown) which adjusts the zero point when the zero point adjustment switch 16 is pressed.

The zero point adjustment switch 16 is a switch which is turned on when an operator presses a pressing portion 18a provided on the cap 18. When the zero point adjustment switch 16 is turned on, the zero point adjustment circuit adjusts the pressure signal output from the pressure sensor 12 at that time to be set as an initial value (zero). This operation is a manipulation necessary at the time of starting the measurement of the pressure signal after the pressure detection device 100 is assembled. This is because it is necessary to preliminarily set, as a pressure detection value zero, a state in which an urging force from the pressure transmission portion 11 is supplied to the pressure sensor 12 so that the pressure detection device 100 can measure the negative pressure. Thus, even when the urging force to be supplied to the pressure sensor 12 varies depending on the individual pressure transmission portion 11 of the pressure detection device 100, the state in which the pressure detection value is zero can be appropriately set and the pressure can be accurately measured.

The housing 17 is a member formed into a cylindrical shape about the axis line X, and the inner peripheral surface at the lower end of the housing 17 is mounted to the outer peripheral surface on the upper end side of the body portion 13. The housing 17 accommodates the sensor substrate 15 in the inner peripheral side thereof.

The cap 18 is a member to be mounted to the inner peripheral surface at the upper end of the housing 17 so as to seal the upper end of the housing 17. The pressing portion 18a disposed so as to contact the zero point adjustment switch 16 is mounted to the cap 18.

The holding member 19 is a member disposed between the diaphragm 22 and the pressure sensor 12 so as to hold an outer peripheral portion 22b of the diaphragm 22, and is formed in an annular shape about the axis line X.

As shown in FIG. 2, the holding member 19 is disposed so that one surface 19b at the lower end of the holding member 19 along the axis line X is in contact with the outer peripheral portion 22b of the diaphragm 22, and the other surface 19a at the upper end of the holding member 19 along the axis line X is in contact with the base portion 12b of the pressure sensor 12.

Next, the flow channel unit 20 will be described in detail with reference to FIGS. 3 and 4.

An inflow pipe (not shown) through which the fluid is caused to flow into the inflow port 21b is mounted to the inflow port 21b of the flow channel unit 20, and an outflow pipe (not shown) for circulating the fluid flowing from the outflow port 21c is mounted to the outflow port 21c of the flow channel unit 20. The pressure of the fluid circulated through the flow channel 21a from the inflow port 21b toward the outflow port 21c is detected by the pressure detection unit 10.

The fluid described herein refers to, for example, a liquid such as blood or dialysis fluid.

Figure 3:
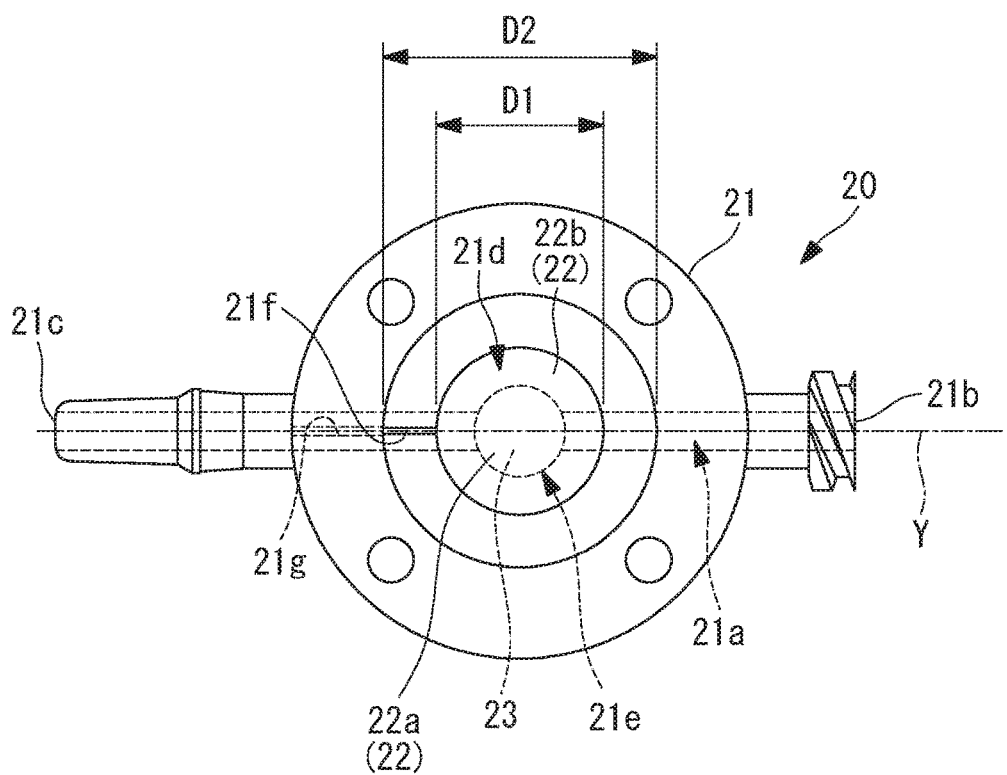
FIG. 3 is a plan view of a flow channel unit shown in FIG. 1.
Figure 4:
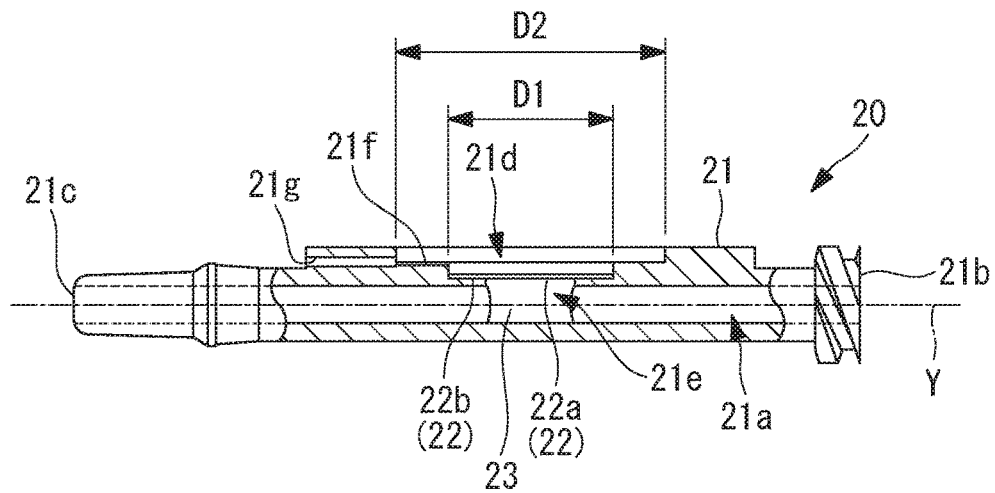
FIG. 4 is a partial longitudinal sectional view of the flow channel unit shown in FIG. 1.

As shown in FIGS. 3 and 4, the flow channel unit 20 includes the flow channel body 21 including the flow channel 21a for circulating the fluid in the circulation direction extending along the axis line Y from the inflow port 21b to the outflow port 21c, and the diaphragm 22 which has a circular shape in plan view and is formed into a thin-film shape.

The flow channel body 21 is a member formed of polycarbonate, PFA, PVC, or the like, and a recess 21d having an opening hole 21e which has a circular shape in plan view and is opened to the flow channel 21a is formed.

In a region in which the diameter of the recess 21d is D1, the outer peripheral portion 22b of the diaphragm 22 is joined to a portion excluding the opening hole 21e. The outer diameter of the diaphragm 22 is equal to or slightly smaller than the diameter D1 of the recess 21d. The flow channel body 21 and the diaphragm 22 are joined by a method of partially melting the material itself by ultrasonic welding or thermal welding, or by a method using an adhesive.

In a region in which the diameter of the recess 21d is D2, the base portion 12b of the pressure sensor 12 is disposed in a state where the base portion 12b contacts the flow channel unit 20 so as to cover the recess 21d.

As shown in FIG. 2, when the pressure sensor 12 is disposed in a state where the pressure sensor 12 is in contact with the flow channel unit 20, the inside space S1 which is partitioned by the recess 21d and the pressure sensor 12 is formed.

As shown in FIGS. 2 to 4, the flow channel body 21 is provided with the vent groove 21f (communication flow channel) that communicates with the inside space S1 in the state where the pressure sensor 12 is in contact with the flow channel unit 20. The flow channel body 21 is also provided with the vent hole 21g (communication flow channel) that allows the vent groove 21f and the outside space S2 to communicate with each other.

As shown in FIG. 2, the holding member 19 is provided with a vent groove 19c that allows the inside space S1 and the vent groove 21f to communicate with each other.

The vent groove 21f, the vent hole 21g, and the vent groove 19c of the flow channel unit 20 allow the inside space S1 and the outside space S2 to communicate with each other. With this structure, the inside space S1 is maintained at the same atmospheric pressure state as that in the outside space S2.

Next, the diaphragm 22 included in the flow channel unit 20 will be described.

The diaphragm 22 is a member which is formed into a thin-film shape and made of a material having a corrosion resistance (for example, a silicon resin material). The diaphragm 22 is a member formed into a circular shape in plan view about the axis line X, and the outer peripheral portion 22b of the diaphragm 22 is joined to the recess 21d. Accordingly, the fluid introduced into a fluid chamber 23 is prevented from flowing to the outside from the opening hole 21e which is formed in the flow channel unit 20. The diaphragm 22, which is formed into a thin-film shape, receives the pressure of the fluid introduced into the fluid chamber 23 and is displaced in the direction along the axis line X.

As shown in FIG. 2, in the state where the flow channel unit 20 is mounted to the pressure detection unit 10, the diaphragm 22 of the flow channel unit 20 is in contact with the spherical member 11a of the pressure transmission portion 11. Further, the upper end face of the shaft-like member 11b of the pressure transmission portion 11 is joined to the diaphragm 12a.

The diaphragm 22 is disposed on a plane orthogonal to the axis line X in the state where the pressure transmission portion 11 of the pressure sensor 12 is not in contact with the diaphragm 22.

On the other hand, as shown in FIG. 2, in the state where the pressure transmission portion 11 is in contact with the diaphragm 22, the diaphragm 22 is in a state where the inner peripheral portion 22a is displaced downward along the axis line X by the pressure transmission portion 11. In the state shown in FIG. 2, the diaphragm 22 presses the pressure transmission portion 11 upward along the axis line X by an urging force generated by elastic deformation.

In this manner, in the pressure detection device 100 of the first embodiment, the pressure transmission portion 11 is disposed in a state where the pressure transmission portion 11 displaces the diaphragm 22 toward the flow channel 21a and receives the urging force directed from the diaphragm 22 to the diaphragm 12a.

Accordingly, even when the pressure of the fluid in the fluid chamber 23 becomes a negative pressure which is lower than the atmospheric pressure, the diaphragm 12a can receive the pressure having a value obtained by subtracting the pressure value corresponding to the negative pressure from the pressure value equivalent to the urging force received by the pressure transmission portion 11 from the diaphragm 22.

The operation and effects of the pressure detection device 100 of the above first embodiment will be described.

In the pressure detection device 100 of the first embodiment, the pressure transmission portion 11 which is disposed in the state where one end of the pressure transmission portion 11 is in contact with the diaphragm 12a of the pressure sensor 12 and the other end thereof is in contact with the diaphragm 22 of the flow channel unit 20 is disposed in the state of receiving the urging force directed from the diaphragm 22 to the diaphragm 12a.

Accordingly, even when the pressure of the fluid circulated through the flow channel 21a is temporarily reduced and becomes a negative pressure which is lower than the atmospheric pressure, the diaphragm 12a is in the state of receiving the pressure having a value obtained by subtracting the pressure value corresponding to the negative pressure from the pressure value equivalent to the urging force received by the pressure transmission portion 11 from the diaphragm 22. Thus, even when the pressure of the fluid is temporarily reduced and becomes a negative pressure, the diaphragm 12a can obtain the pressure value by subtracting a decrease in the pressure value corresponding to the negative pressure from the pressure value equivalent to the urging force received from the diaphragm 22.

In this manner, according to the pressure detection device 100 of the first embodiment, it is possible to provide the pressure detection device 100 capable of accurately detecting the pressure of the fluid even when the pressure of the fluid is temporarily reduced and becomes a negative pressure.

In the pressure detection device 100 of the first embodiment, the flow channel unit 20 includes the vent groove 21f and the vent hole 21g as a communication flow channel for allowing the inside space S1 and the outside space S2, which are partitioned by the recess 21d and the pressure sensor 12, to communicate with each other.

With this structure, the inside space S1 and the outside space S2 which are partitioned by the pressure sensor 12 and the recess 21d in which the diaphragm 22 of the flow channel unit 20 is disposed communicate with each other. Accordingly, it is possible to suppress the occurrence of a malfunction that the volume of the inside space S1 fluctuates according to the displacement of the diaphragm 22 and the pressure of the inside space S1 fluctuates according to the fluctuation in the volume of the inside space S1.

According to the pressure detection device 100 of the first embodiment, the annular holding member 19 is disposed in the state where the outer peripheral portion 22b of the diaphragm 22 is joined to the recess 21d and one surface 19b is in contact with the outer peripheral portion 22b. The holding member 19 is disposed in the state where the other surface 19a is in contact with the pressure sensor 12, so that the outer peripheral portion 22b of the diaphragm 22 is held by the holding member 19.

Accordingly, even when the inner peripheral portion 22a of the diaphragm 22 which is exposed to the opening hole 21e is repeatedly displaced by the pressure of the fluid, the outer peripheral portion 22b of the diaphragm 22 is held by the holding member 19. Therefore, the occurrence of a malfunction, such as the occurrence of peeling or the like at a joint portion between the recess 21d and the outer peripheral portion 22b of the diaphragm 22, can be suppressed.

In the pressure detection device 100 of the first embodiment, the contact area between the shaft-like member 11b and the diaphragm 12a is smaller than the contact area between the spherical member 11a and the diaphragm 22.

Accordingly, the fluid pressure received by the spherical member 11a from the diaphragm 22 can be transmitted by locally concentrating the pressure on the diaphragm 12a through the shaft-like member 11b. Accordingly, the fluctuation in the pressure locally received by the diaphragm 12a can be increased with respect to the fluctuation in the fluid pressure, and thus the accuracy of detecting the fluctuation in the fluid pressure can be increased.

In the pressure detection device 100 of the first embodiment, the spherical member 11a is a member formed into a spherical shape projecting toward the diaphragm 22. Accordingly, the contact area where the spherical member 11a contacts the diaphragm 22 is maintained substantially constant, regardless of the displacement of the diaphragm 22, and thus the accuracy of transmitting the pressure of the fluid from the diaphragm 22 to the spherical member 11a can be increased.

Second Embodiment

Next, a pressure detection device according to a second embodiment of the present disclosure will be described with reference to the drawings.

The second embodiment is a modified example of the first embodiment. The second embodiment is similar to the first embodiment, unless otherwise specified below, and the components of the second embodiment that are similar to those of the first embodiment are denoted by the same reference numerals as those of the first embodiment, and the descriptions thereof are omitted.

In the pressure detection device 100 of the first embodiment, the pressure transmission portion 11 includes the shaft-like member 11b which is joined to the diaphragm 12a.

On the other hand, a pressure transmission portion 11' of the second embodiment includes a spherical member 11c (second pressure transmission member) which is disposed so as to contact the diaphragm 12a.

Figure 5:
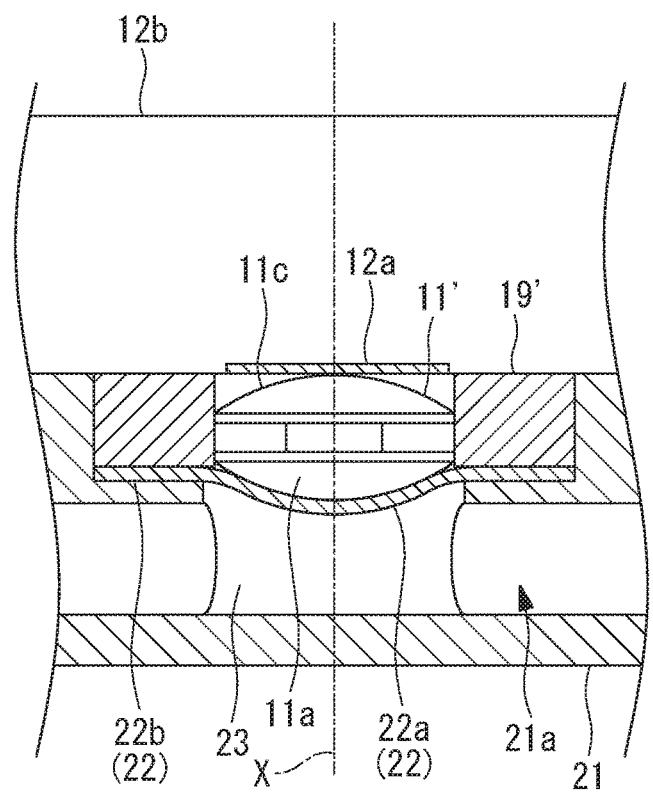
FIG. 5 is a partial enlarged view showing a pressure detection device according to a second embodiment.

As shown in FIG. 5, the spherical member 11c included in the pressure transmission portion 11' of the second embodiment is disposed so as to contact the diaphragm 12a, and is formed into a spherical shape projecting toward the diaphragm 12a.

The spherical member 11c and the diaphragm 12a are in contact with each other only at a contact position on the axis line X. Accordingly, the contact area between the spherical member 11c and the diaphragm 12a is extremely smaller than the contact area between the spherical member 11a and the diaphragm 22.

As shown in FIG. 5, in the state where the pressure transmission portion 11' is in contact with the diaphragm 22, the diaphragm 22 is in the state in which the inner peripheral portion 22a is displaced downward along the axis line X by the pressure transmission portion 11'. In the state shown in FIG. 5, the diaphragm 22 presses the pressure transmission portion 11' upward along the axis line X by an urging force generated by elastic deformation.

Thus, in the pressure detection device of the second embodiment, the pressure transmission portion 11' is disposed in a state where the diaphragm 22 is displaced toward the flow channel 21a and the urging force directed from the diaphragm 22 to the diaphragm 12a is received.

Accordingly, even when the pressure of the fluid in the fluid chamber 23 becomes a negative pressure which is lower than the atmospheric pressure, the diaphragm 12a is in the state of receiving the pressure having a value obtained by subtracting the pressure value corresponding to the negative pressure from the pressure value equivalent to the urging force received by the pressure transmission portion 11' from the diaphragm 22.

Further, the holding member 19' (guide member) of the second embodiment has a function of holding the outer peripheral portion 22b of the diaphragm 22 between the flow channel body 21 and the base portion 12b of the pressure sensor 12, as well as a guide function of guiding the pressure transmission portion 11' to be moved along the axis line X.

As shown in FIG. 5, in a radial direction orthogonal to the axis line X, the outer diameter of the pressure transmission portion 11' is equal to or slightly smaller than the inner diameter of the holding member 19'. Accordingly, when the diaphragm 22 is displaced in accordance with a fluctuation in the fluid pressure, the pressure transmission portion 11' is guided to be moved along the axis line X by the inner peripheral surface of the holding member 19'.

In the pressure detection device according to the second embodiment described above, the spherical member 11a can transmit the fluid pressure received from the diaphragm 22 by locally concentrating the pressure on the diaphragm 12a through the spherical member 11c. Accordingly, the fluctuation in the pressure locally received by the diaphragm 12a can be increased with respect to the fluctuation in the fluid pressure, and thus the accuracy of detecting the fluctuation in the fluid pressure can be increased.

Although the spherical member 11c is not joined to the diaphragm 12a, the spherical member 11c is guided to be moved along the axis line X by the inner peripheral surface of the holding member 19'. Accordingly, the position where the spherical member 11c contacts the diaphragm 12a is determined to be a position on the axis line X, and thus the occurrence of an error in the detection of the pressure by the diaphragm 12a can be suppressed.

Third Embodiment

Next, a pressure detection device according to a third embodiment of the present disclosure will be described with reference to the drawings.

The third embodiment is a modified example of the first embodiment. The third embodiment is similar to the first embodiment, unless otherwise specified below, and the components of the third embodiment that are similar to those of the first embodiment are denoted by the same reference numerals as those of the first embodiment, and the descriptions thereof are omitted.

In the pressure detection device 100 of the first embodiment, the pressure transmission portion 11 includes the spherical member 11a which is in contact with the diaphragm 22, and the shaft-like member 11b which is joined to the diaphragm 12a.

On the other hand, a pressure transmission portion 11" of the third embodiment is disposed in the state where the pressure transmission portion 11" is in contact with the diaphragm 22 and the diaphragm 12a, and is formed into a spherical shape.

Figure 6:
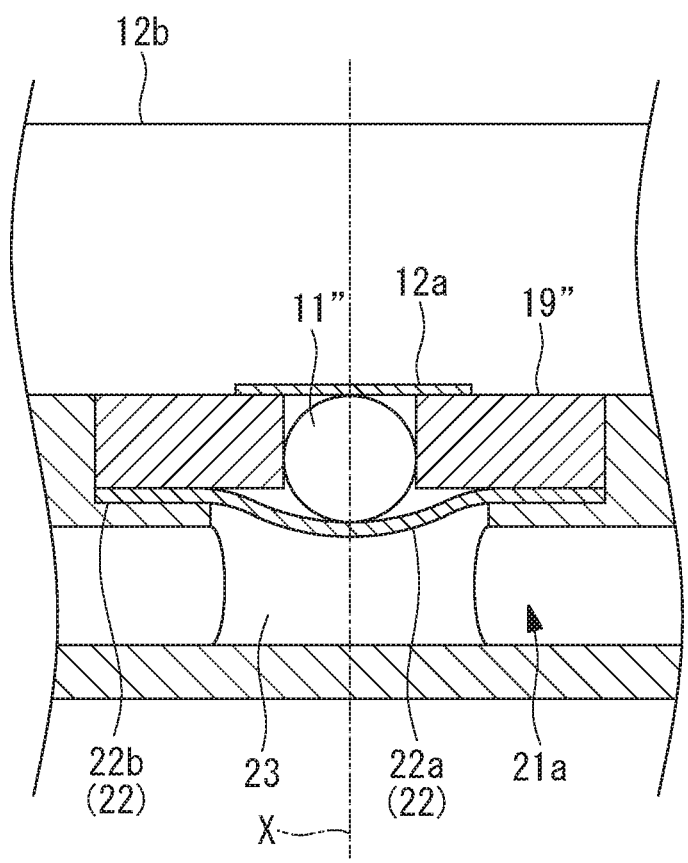
FIG. 6 is a partial enlarged view showing a pressure detection device according to a third embodiment.

As shown in FIG. 6, the pressure transmission portion 11" and the diaphragm 12a are in contact with each other only at a contact position on the axis line X. Accordingly, the contact area between the pressure transmission portion 11" and the diaphragm 12a is extremely smaller than the contact area between the pressure transmission portion 11" and the diaphragm 22.

As shown in FIG. 6, in the state where the pressure transmission portion 11" is in contact with the diaphragm 22, the diaphragm 22 is in the state where the inner peripheral portion 22a is displaced downward along the axis line X by the pressure transmission portion 11". In the state shown in FIG. 6, the diaphragm 22 presses the pressure transmission portion 11" upward along the axis line X by an urging force generated by elastic deformation.

Thus, in the pressure detection device of the third embodiment, the pressure transmission portion 11" is disposed in the state where the diaphragm 22 is displaced toward the flow channel 21a and the urging force directed from the diaphragm 22 to the diaphragm 12a is received.

Accordingly, even when the pressure of the fluid in the fluid chamber 23 becomes a negative pressure which is lower than the atmospheric pressure, the diaphragm 12a is in the state of receiving the pressure having a value obtained by subtracting the pressure value corresponding to the negative pressure from the pressure value equivalent to the urging force received by the pressure transmission portion 11" from the diaphragm 22.

A holding member 19" (guide member) according to the third embodiment has a guide function of guiding the pressure transmission portion 11" to be moved along the axis line X, as well as a function of holding the outer peripheral portion 22b of the diaphragm 22 between the base portion 12b of the pressure sensor 12 and the flow channel body 21.

As shown in FIG. 6, in the radial direction orthogonal to the axis line X, the outer diameter of the pressure transmission portion 11" is equal to or slightly smaller than the inner diameter of the holding member 19". Accordingly, when the diaphragm 22 is displaced in accordance with a fluctuation in the fluid pressure, the pressure transmission portion 11" is guided to be moved along the axis line X by the inner peripheral surface of the holding member 19".

In the pressure detection device according to the third embodiment described above, the pressure transmission portion 11" can transmit the fluid pressure received from the diaphragm 22 by locally concentrating the pressure on the diaphragm 12a through the pressure transmission portion 11". Accordingly, the fluctuation in the pressure locally received by the diaphragm 12a can be increased with respect to the fluctuation in the fluid pressure, and thus the accuracy of detecting the fluctuation in the fluid pressure can be increased.

Although the pressure transmission portion 11" is not joined to the diaphragm 12a, the pressure transmission portion 11" is guided to be moved along the axis line X by the inner peripheral surface of the holding member 19". Accordingly, the contact position where the pressure transmission portion 11" contacts the diaphragm 12a is determined to be a position on the axis line X, and thus the occurrence of an error in detecting the pressure by the diaphragm 12a can be suppressed.

Other Embodiments

In the above description, the pressure sensor 12 is a strain sensor that outputs a pressure signal according to a strain resistance which varies depending on the pressure to be transmitted to the diaphragm 12a. However, the pressure sensor 12 may have another aspect.

For example, a capacitance pressure sensor may be used.

In the above description, the flow channel unit 20 includes the flow channel body 21 and the diaphragm 22 to be joined to the flow channel body 21. However, the flow channel unit 20 may have another aspect.

For example, the flow channel unit 20 may have a structure in which the flow channel body 21 and the diaphragm 22 are integrally formed of a single material.

The invention claimed is:

1. A pressure detection device comprising:
 a pressure detection unit configured to detect a pressure to be transmitted to a pressure detection portion; and
 a flow channel unit provided with a flow channel through which a fluid is circulated in a circulation direction from an inflow port to an outflow port, and a pressure receiving portion configured to be displaced by receiving a pressure of the fluid circulated through the flow channel, wherein
 the pressure detection unit includes:
  a pressure sensor including the pressure detection portion; and
  a pressure transmission portion disposed in a state where one end of the pressure transmission portion is in contact with the pressure detection portion and the other end of the pressure transmission portion is in contact with the pressure receiving portion, the pressure transmission portion being configured to transmit, to the pressure detection portion, the pressure of the fluid received by the pressure receiving portion, and
 the pressure transmission portion is disposed in a state where the pressure receiving portion is displaced toward the flow channel and an urging force directed from the pressure receiving portion to the pressure detection portion is received.

2. The pressure detection device according to claim 1, wherein
 the flow channel unit includes a recess in which the pressure receiving portion is disposed,
 the pressure sensor is disposed in a state where the pressure sensor is in contact with the flow channel unit so as to cover the recess, and
 the flow channel unit includes a communication flow channel configured to allow an inside space and an outside space to communicate with each other, the inside space and the outside space being partitioned by the recess and the pressure sensor.

3. The pressure detection device according to claim 1, wherein
 the flow channel unit includes:
  the pressure receiving portion having a circular shape in plan view and formed into a thin film shape; and
  a flow channel body including the recess with an opening hole opened to the flow channel,
 the pressure receiving portion is joined to the recess so as to seal the opening hole, and
 the flow channel unit includes an annular holding member disposed in a state where one surface of the holding member is in contact with an outer peripheral portion of the pressure receiving portion and the other surface of the holding member is in contact with the pressure sensor, the holding member being configured to hold the outer peripheral portion of the pressure receiving portion.

4. The pressure detection device according to claim 1, wherein
 the pressure transmission portion includes:
  a first pressure transmission member disposed in a state where the first pressure transmission member is in contact with the pressure receiving portion; and
  a second pressure transmission member disposed in a state where the second pressure transmission member is in contact with the pressure detection portion, and
 a contact area between the second pressure transmission member and the pressure detection portion is smaller than a contact area between the first pressure transmission member and the pressure receiving portion.

5. The pressure detection device according to claim 4, wherein the first pressure transmission member is a member formed into a spherical shape projecting toward the pressure receiving portion.

6. The pressure detection device according to claim 5, wherein the second pressure transmission member is a member formed into a spherical shape projecting toward the pressure detection portion.

7. The pressure detection device according to claim 1, wherein the pressure transmission portion is disposed in a state where the pressure transmission portion is in contact with the pressure receiving portion and the pressure detection portion, and is formed into a spherical shape.

8. The pressure detection device according to claim 2, wherein the pressure transmission portion is disposed in a state where the pressure transmission portion is in contact with the pressure receiving portion and the pressure detection portion, and is formed into a spherical shape.

9. The pressure detection device according to claim 3, wherein the pressure transmission portion is disposed in a state where the pressure transmission portion is in contact with the pressure receiving portion and the pressure detection portion, and is formed into a spherical shape.

* * * * *